US011836119B2

(12) United States Patent
Auger (10) Patent No.: US 11,836,119 B2
(45) Date of Patent: *Dec. 5, 2023

(54) SYSTEMS AND METHODS FOR GENERATING AND ASSIGNING METADATA TAGS (71) Applicant: D2L Corporation, Kitchener (CA)

(72) Inventor: Jeremy Jason Auger, Kitchener (CA)

(73) Assignee: D2L Corporation, Kitchener (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/510,723

(22) Filed: Oct. 26, 2021

(65) Prior Publication Data

US 2022/0043781 A1 Feb. 10, 2022

Related U.S. Application Data (63) Continuation of application No. 16/355,907, filed on Mar. 18, 2019, now Pat. No. 11,182,351, which is a continuation of application No. 15/234,506, filed on Aug. 11, 2016, now Pat. No. 10,268,700, which is a continuation of application No. 14/067,532, filed on Oct. 30, 2013, now Pat. No. 9,418,090.

(60) Provisional application No. 61/720,312, filed on Oct. 30, 2012.

(51) Int. Cl.
*G06F 16/00* (2019.01)
*G06F 16/185* (2019.01)
*G06F 16/22* (2019.01)
*G06F 16/16* (2019.01)

(52) U.S. Cl.
CPC .......... *G06F 16/185* (2019.01); *G06F 16/168* (2019.01); *G06F 16/22* (2019.01)

(58) Field of Classification Search
None
See application file for complete search history.

(56) References Cited

U.S. PATENT DOCUMENTS

| 6,094,672 | A | 7/2000 | Willie et al. |
| 6,988,138 | B1 | 1/2006 | Alcorn et al. |
| 7,386,535 | B1 * | 6/2008 | Kalucha ................ G06Q 10/10 |
| 8,370,362 | B2 | 2/2013 | Szabo |
| 10,423,696 | B2 | 9/2019 | Bishop |
| 2003/0080990 | A1 | 5/2003 | Lyness |
| 2003/0152901 | A1 | 8/2003 | Altenhofen et al. |

(Continued)

OTHER PUBLICATIONS

A New Trend for E-learning in KSA Using Educational Clouds, ACN, (Year: 2012).*

(Continued)

*Primary Examiner* — Jean M Corrielus
(74) *Attorney, Agent, or Firm* — BERESKIN & PARR LLP/S.E.N.C.R.L., s.r.l.

(57) ABSTRACT

An information management system including at least one data storage device and at least one processor coupled to the at least one data storage device. The at least one processor is configured to receive at least one object, the object having a location in a hierarchical file organizational structure. The processor also generates at least one prospective keyword for the at least one object based upon the location of the object in the hierarchical organization structure, and associates the at least one object with at least one of the prospective keywords.

10 Claims, 9 Drawing Sheets

(56) References Cited

U.S. PATENT DOCUMENTS

| | | |
|---|---|---|
| 2003/0152902 A1* | 8/2003 | Altenhofen .............. G09B 7/00 434/350 |
| 2003/0157470 A1 | 8/2003 | Altenhofen et al. |
| 2005/0079477 A1 | 4/2005 | Diesel et al. |
| 2005/0086296 A1* | 4/2005 | Chi .................. G06Q 10/10 709/219 |
| 2005/0102322 A1 | 5/2005 | Bagley et al. |
| 2005/0227216 A1 | 10/2005 | Gupta |
| 2006/0008789 A1 | 1/2006 | Gerteis |
| 2006/0026213 A1* | 2/2006 | Yaskin ................ G09B 7/02 |
| 2006/0046242 A1 | 3/2006 | Takano et al. |
| 2006/0069690 A1 | 3/2006 | Patel et al. |
| 2006/0230086 A1 | 10/2006 | Devarakonda et al. |
| 2006/0286536 A1 | 12/2006 | Mohler et al. |
| 2007/0016650 A1 | 1/2007 | Gilbert et al. |
| 2007/0099161 A1* | 5/2007 | Krebs ................ G09B 7/00 434/362 |
| 2007/0111183 A1 | 5/2007 | Krebs et al. |
| 2007/0111185 A1* | 5/2007 | Krebs ................ G09B 5/00 434/350 |
| 2007/0224585 A1 | 9/2007 | Gerteis et al. |
| 2007/0234202 A1 | 10/2007 | Lyness |
| 2007/0298403 A1 | 12/2007 | Zhou et al. |
| 2008/0082463 A1 | 4/2008 | Cheng et al. |
| 2008/0082466 A1 | 4/2008 | Meijer et al. |
| 2008/0172628 A1 | 7/2008 | Mehrotra et al. |
| 2008/0177810 A1 | 7/2008 | Devarakonda et al. |
| 2009/0162822 A1 | 6/2009 | Strachan et al. |
| 2009/0162828 A1 | 6/2009 | Strachan et al. |
| 2009/0197232 A1* | 8/2009 | Couch ................ G09B 7/00 434/322 |
| 2009/0281923 A1 | 11/2009 | Selinger et al. |
| 2009/0309893 A1 | 12/2009 | Boothroyd et al. |
| 2010/0235395 A1* | 9/2010 | Cepuran ................ G09B 5/00 709/205 |
| 2011/0159472 A1 | 6/2011 | Eck et al. |
| 2011/0208822 A1 | 8/2011 | Rathod |
| 2012/0149000 A1 | 6/2012 | Baker et al. |
| 2012/0194502 A1 | 8/2012 | Smith et al. |
| 2012/0198547 A1 | 8/2012 | Fredette et al. |
| 2013/0007061 A1 | 1/2013 | Luomala et al. |
| 2013/0091240 A1 | 4/2013 | Auger et al. |
| 2013/0159335 A1 | 6/2013 | Baker et al. |
| 2014/0087352 A1 | 3/2014 | Hillier et al. |
| 2014/0147742 A1 | 5/2014 | Anastas et al. |
| 2015/0180833 A1 | 6/2015 | Snow et al. |
| 2016/0323693 A1 | 11/2016 | Rathod |
| 2016/0350330 A1 | 12/2016 | Auger |

OTHER PUBLICATIONS

A Comparative Study of Open-source Learning Management Systems, Hussain et al., (Year: 2011).*

Yoann Padioleau et al.—"LISFS: a Logical Information System as a File System" - Published in: Proceeding ICSE '06 Proceedings of the 28th international conference on Software engineering—ICSE 06, May 20-28, 2006, Shanghai, China,—pp. 803-806.

Sarah Henderson and Ananth Srinivasan—"An Empirical Analysis of Personal Digital Document Structures" - Chapter Human Interface and the Management of Information, Designing Information Environments vol. 5617 of the series Lecture Notes in Computer Science 2009 Springer-Verlag Berlin Heidelberg 2009—pp. 394-403.

The use of e-learning Course Management Systems to support learning strategies and to improve self-regulated learning, Vovides et al., (Year: 2007).

Digital tools and challenges to institutional traditions of learning: technologies, social memory and the performative nature of learning, Saljo et al., (Year: 2010).

* cited by examiner

| Object Id. | Object Type | Object Name | Metadata Tags | Address |
|---|---|---|---|---|
| 1 | Folder | Economics | ECON106 | Add01 |
| 2 | Folder | Mathematics | MATH108 | Add02 |
| 3 | Folder | Philosophy | PHIL110 | Add03 |
| 4 | Folder | Physics | PHYS112 | Add04 |
| 5 | Folder | Computer Science | CISC114; CS; COMPSCI; | Add05 |
| 6 | Folder | Notes | ECON106; Notes | Add06 |
| 7 | Folder | Lecture Slides | ECON106; Lectures; Handouts | Add07 |
| 8 | Folder | Assignments | ECON106; Assignments; Work | Add08 |
| 9 | Folder | Week 1 | ECON106; Notes; W1 | Add09 |
| 10 | Folder | Week 2 | ECON106; Notes; W2 | Add10 |
| 11 | Folder | Week 3 | ECON106; Notes: W3 | Add11 |
| 12 | Text File | L1.txt | ECON106; Notes; W1 | Add12 |
| 13 | Video File | L2.mpeg | ECON106; Notes; W1; Keyensian; Test Material | Add13 |
| 14 | PDF File | Graphs.pdf | ECON106; Notes; W1 | Add14 |
| 15 | Audio File | L1_Rec.mp3 | ECON106; Notes; W1; Test Material | Add15 |
| 16 | Text File | New_File.txt | ECON106; Notes; W1 | Add16 |

SYSTEMS AND METHODS FOR GENERATING AND ASSIGNING METADATA TAGS

RELATED APPLICATIONS

This application is a continuation of U.S. patent application Ser. No. 16/355,907 filed Mar. 18, 2019, which is a U.S. patent application Ser. No. 15/234,506 filed Aug. 11, 2016, issued as U.S. Pat. No. 10,268,700 on Apr. 23, 2019, which is a continuation of U.S. patent application Ser. No. 14/067,532 filed Oct. 30, 2013, issued as U.S. Pat. No. 9,418,090 on Aug. 16, 2016, and which claims the benefit of U.S. Provisional Patent Application Ser. No. 61/720,312 filed Oct. 30, 2012, the entire contents of all such applications being hereby incorporated by reference herein for all purposes.

TECHNICAL FIELD

The embodiments herein relate to information management systems, and in particular to information management systems and methods for electronic learning (e-Learning) systems.

INTRODUCTION

Electronic learning (also called e-Learning or eLearning) generally refers to education or learning where users (e.g. learners, instructors, administrative staff) engage in education related activities using computers and other computing devices. For examples, learners may enroll or participate in a course or program of study offered by an educational institution (e.g. a college, university or grade school) through a web interface that is accessible over the Internet. Similarly, learners may receive assignments electronically, participate in group work and projects by collaborating online, and be graded based on assignments and examinations that are submitted using an electronic dropbox.

Electronic learning is not limited to use by educational institutions, however, and may also be used in governments or in corporate environments. For example, employees at a regional branch office of a particular company may use electronic learning to participate in a training course offered by their company's head office without ever physically leaving the branch office.

Electronic learning can also be an individual activity with no institution driving the learning. For example, individuals may participate in self-directed study (e.g. studying an electronic textbook or watching a recorded or live webcast of a lecture) that is not associated with a particular institution or organization.

Electronic learning often occurs without any face-to-face interaction between the users in the educational community. Accordingly, electronic learning overcomes some of the geographic limitations associated with more traditional learning methods, and may eliminate or greatly reduce travel and relocation requirements imposed on users of educational services.

Furthermore, because course materials can be offered and consumed electronically, there are often fewer physical restrictions on learning. For example, the number of learners that can be enrolled in a particular course may be practically limitless, as there may be no requirement for physical facilities to house the learners during lectures.

Furthermore, learning materials (e.g. handouts, textbooks, etc.) may be provided in electronic formats so that they can be reproduced for a virtually unlimited number of learners.

Finally, lectures may be recorded and accessed at varying times (e.g. at different times that are convenient for different users), thus accommodating users with varying schedules, and allowing users to be enrolled in multiple courses that might have a scheduling conflict when offered using traditional techniques.

In many cases, learners participating in electronic learning may be presented a large number of learning materials in an electronic format. In these cases, it may be challenging for the learner to organize, sort or search through a large number of materials to locate desired learning materials.

BRIEF DESCRIPTION OF THE DRAWINGS

Various embodiments will now be described, by way of example only, with reference to the following drawings, in which.

DETAILED DESCRIPTION OF SOME EMBODIMENTS

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Furthermore, this description is not to be considered as limiting the scope of the embodiments described herein in any way, but rather as merely describing the implementation of various embodiments as described.

In some cases, the embodiments of the systems and methods described herein may be implemented in hardware or software, or a combination of both. In some cases, embodiments may be implemented in one or more computer programs executing on one or more programmable computing devices comprising at least one processor, a data storage device (including in some cases volatile and non-volatile memory and/or data storage elements), at least one input device, and at least one output device.

In some embodiments, each program may be implemented in a high level procedural or object oriented programming and/or scripting language to communicate with a computer system. However, the programs can be implemented in assembly or machine language, if desired. In any case, the language may be a compiled or interpreted language.

In some embodiments, the systems and methods as described herein may also be implemented as a non-transitory computer-readable storage medium configured with a computer program, wherein the storage medium so configured causes a computer to operate in a specific and predefined manner to perform at least some of the functions as described herein.

Figure 1:
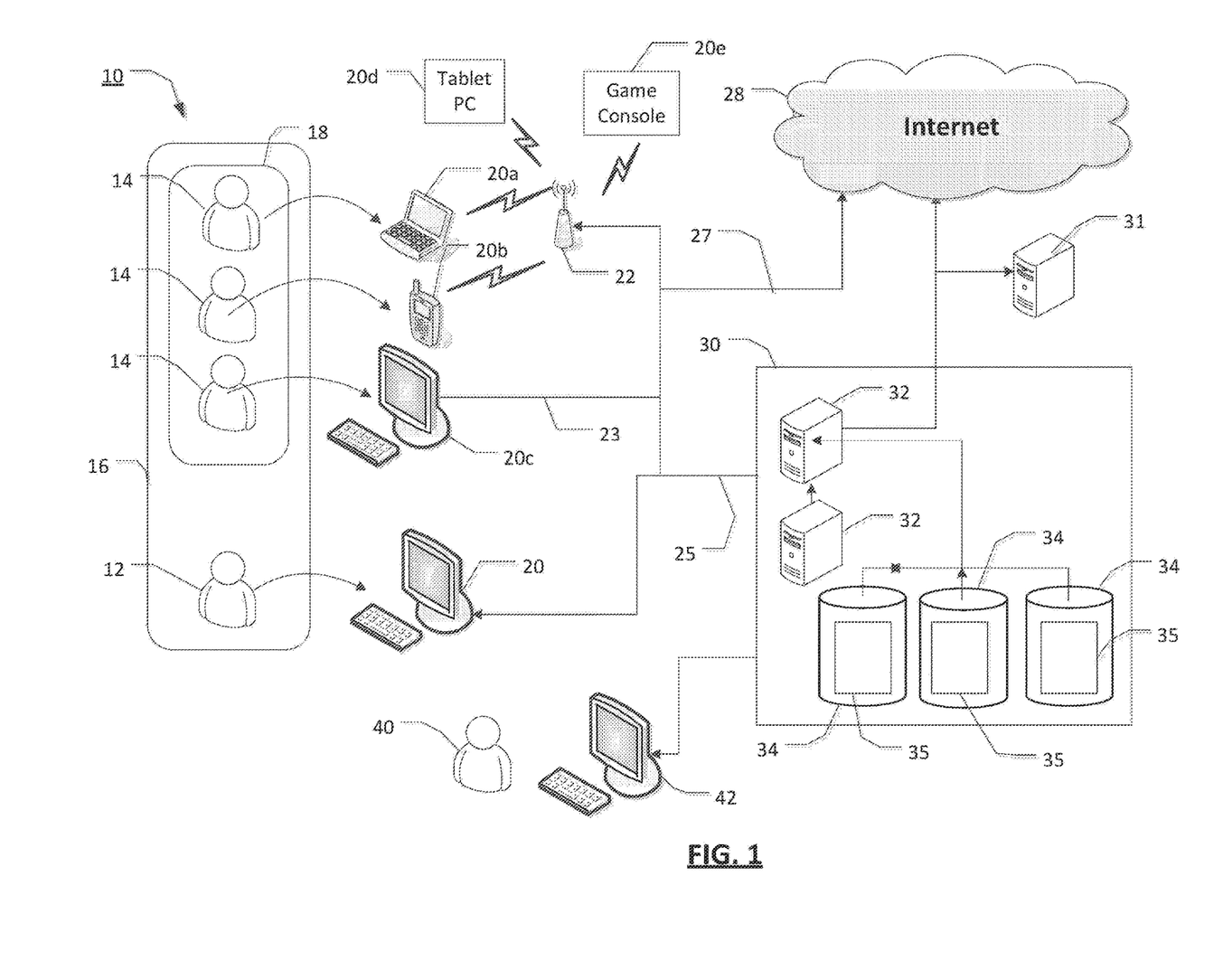
FIG. 1 is a schematic diagram illustrating an information management system according to some embodiments.

Referring now to FIG. 1, illustrated therein is an information management system 10 according to some embodiments. The system 10 as shown may be an electronic learning system or eLearning system. However, in other instances the system 10 may not be limited to electronic learning systems and it may be used with other types of systems.

Using the system 10, one or more users 12, 14 may communicate with an educational service provider 30 to participate in, create, and consume electronic learning services, including educational courses. In some cases, the educational service provider 30 may be part of (or associated with) a traditional "bricks and mortar" educational institution (e.g. a grade school, university or college), another entity that provides educational services (e.g. an online university, a company that specializes in offering training courses, an organization that has a training department, etc.), or may be an independent service provider (e.g. for providing individual electronic learning).

It should be understood that a course is not limited to courses offered by formal educational institutions. The course may include any form of learning instruction offered by an entity of any type. For example, the course may be a training seminar at a company for a group of employees or a professional certification program (e.g. PMP, CMA, etc.) with a number of intended participants.

In some embodiments, one or more educational groups can be defined that includes one or more of the users 12, 14. For example, as shown in FIG. 1, the users 12, 14 may be grouped together in an educational group 16 representative of a particular course (e.g. History 101, French 254), with a first user 12 or "instructor" being responsible for organizing and/or teaching the course (e.g. developing lectures, preparing assignments, creating educational content etc.), while the other users 14 or "learners" are consumers of the course content (e.g. users 14 are enrolled in the course).

In some examples, the users 12, 14 may be associated with more than one educational group (e.g. the users 14 may be enrolled in more than one course, a user may be enrolled in one course and be responsible for teaching another course, a user may be responsible for teaching a plurality of courses, and so on).

In some cases, educational sub-groups may also be formed. For example, the users 14 are shown as part of educational sub-group 18. The sub-group 18 may be formed in relation to a particular project or assignment (e.g. sub-group 18 may be a lab group) or based on other criteria. In some embodiments, due to the nature of the electronic learning, the users 14 in a particular sub-group 18 need not physically meet, but may collaborate together using various tools provided by the educational service provider 30.

In some embodiments, other groups 16 and sub-groups 18 could include users 14 that share common interests (e.g., interests in a particular sport), that participate in common activities (e.g., users that are members of a choir or a club), and/or have similar attributes (e.g., users that are male or female, users under twenty-one years of age, etc.).

Communication between the users 12, 14 and the educational service provider 30 can occur either directly or indirectly using any one or more suitable computing devices. For example, the user 12 may use a computing device 20 having one or more client processors such as a desktop computer that has at least one input device (e.g. a keyboard and a mouse) and at least one output device (e.g. a display screen and speakers).

The computing device 20 can generally be any suitable device for facilitating communication between the users 12, 14 and the educational service provider 30. For example, the computing device 20 could be a laptop 20a wirelessly coupled to an access point 22 (e.g. a wireless router, a cellular communications tower, etc.), a wirelessly enabled personal data assistant (PDA) 20b or smart phone, a terminal 20c, a tablet computer 20d, or a game console 20e operating over a wired connection 23.

The computing devices 20 may be connected to the service provider 30 via any suitable communications channel. For example, the computing devices 20 may communicate to the educational service provider 30 over a local area network (LAN) or intranet, or using an external network (e.g. by using a browser on the computing device 20 to browse to one or more web pages or other electronic files presented over the Internet 28 via a data connection 27).

In some examples, one or more of the users 12, 14 may be required to authenticate their identities in order to communicate with the educational service provider 30. For example, each of the users 12, 14 may be required to input a user identifier such as a login name, and/or a password associated with that user or otherwise identify themselves to gain access to the system 10.

In some examples, one or more users (e.g., "guest" users) may be able to access the system without authentication. Such guest users may be provided with limited access, such as the ability to review one or more components of the course to decide whether they would like to participate in the course but without the ability to post comments or upload electronic files.

In some embodiments, one or more wireless access points 22 may connect to the educational service provider 30 through a data connection 25 established over the LAN or intranet. Alternatively, the wireless access points 22 may be in communication with the educational service provider 30 via the Internet 28 or another external data communications network. For example, one user 14 may use a laptop 20a to browse to a webpage that displays elements of an electronic learning system (e.g. a course page).

The educational service provider 30 generally includes a number of functional components for facilitating the provision of electronic learning services. For example, the educational service provider 30 generally includes one or more processing devices such as servers 32, each having one or more processors. The processors on the servers 32 will be referred to generally as "remote processors" so as to distinguish them from client processors found in computing devices (20, 20a-20e). The servers 32 are configured to send information (e.g. electronic files such as web pages) to be displayed on one or more computing devices 20 in association with the electronic learning system 10 (e.g. course information). In some embodiments, a server 32 may be a computing device 20 (e.g. a laptop or personal computer).

The educational service provider 30 also generally includes one or more data storage devices 34 (e.g., memory, etc.) that are in communication with the servers 32, and which could include a relational database (such as a SQL database), or other suitable data storage devices. The data storage devices 34 are configured to host data 35 about the courses offered by the service provider (e.g., course frameworks, educational materials to be consumed by the users 14, records of assessments done by users 14, etc.).

The data storage devices 34 may also store authorization criteria that define what actions may be taken by the users 12, 14. In some embodiments, the authorization criteria may include at least one security profile associated with at least one role. For example, one role could be defined for users who are primarily responsible for developing an educational course, teaching it, and assessing work product from other users for that course. Users with such a role may have a security profile that allows them to configure various components of the course, post assignments, add assessments, evaluate performance, and so on.

In some embodiments, some of the authorization criteria may be defined by specific users 40 who may or may not be part of the educational community 16. For example, administrator users 40 may be permitted to administer and/or define global configuration profiles for the system 10, define roles within the system 10, set security profiles associated with the roles, and assign the roles to particular users 12, 14 in the system 10. In some cases, the users 40 may use another computing device (e.g. a desktop computer 42) to accomplish these tasks.

The data storage devices 34 may also be configured to store other information, such as personal information about the users 12, 14 of the system 10, information about which courses the users 14 are enrolled in, roles to which the users 12, 14 are assigned, particular interests of the users 12, 14 and so on.

The servers 32 and data storage devices 34 may also provide other electronic learning management tools (e.g. allowing users to add and drop courses, communicate with other users using chat software, etc.), and/or may be in communication with one or more other vendors that provide the tools.

In some embodiments, the system 10 may also have one or more backup servers 31 that may duplicate some or all of the data 35 stored on the data storage devices 34. The backup servers 31 may be desirable for disaster recovery (e.g. to prevent undesired data loss in the event of an event such as a fire, flooding, or theft). In some embodiments, the backup servers 31 may be directly connected to the educational service provider 30 but located within the system 10 at a different physical location.

Figure 2:
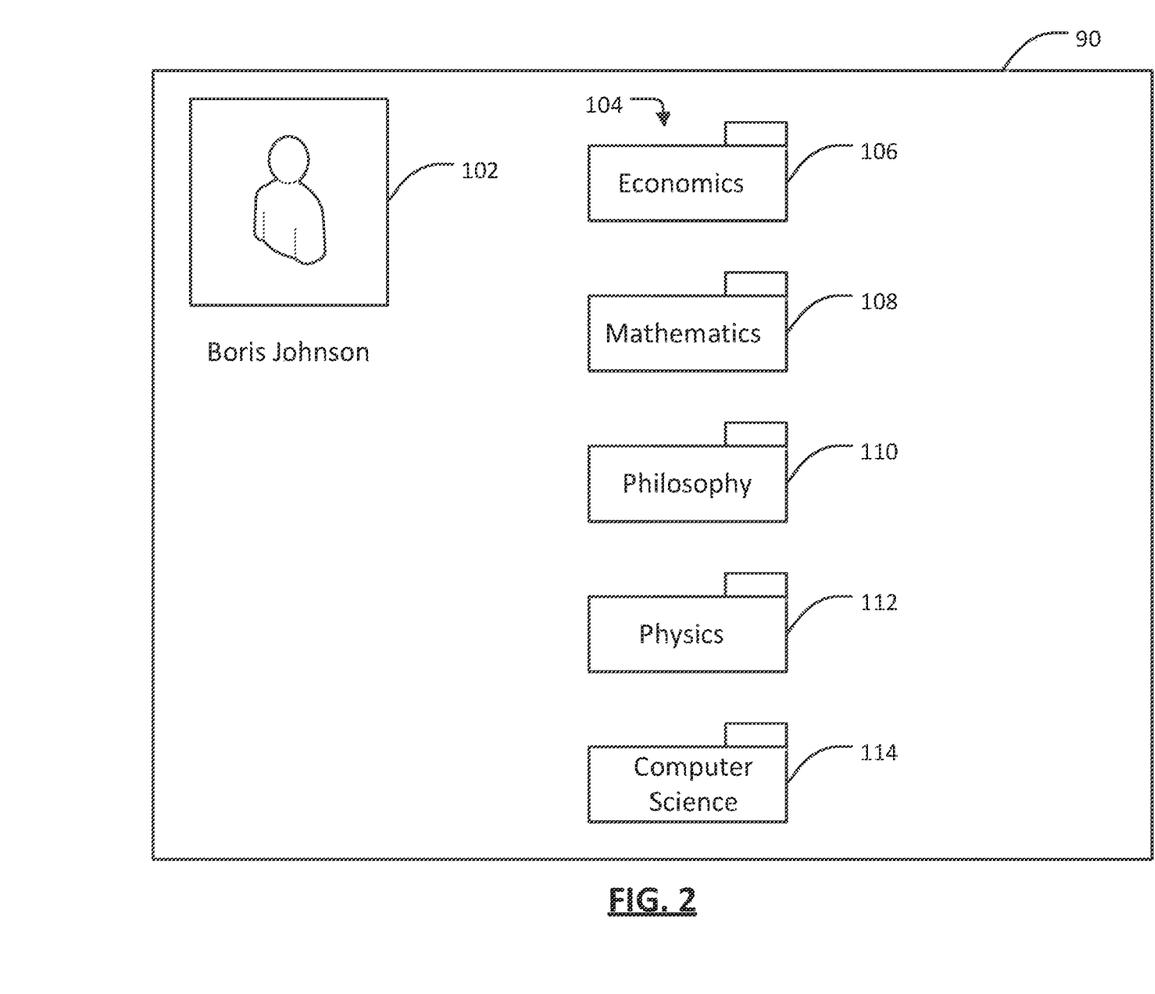
FIG. 2 is a schematic diagram illustrating an exemplary graphical user interface (GUI) that may be provided by one or more processors of the system shown in FIG. 1.

Referring now to FIG. 2, illustrated therein a schematic diagram illustrating an exemplary graphical user interface ("GUI") 90 that may be provided by one or more processors of the system 10. In general the GUI 90 is associated with a user profile 92. One or more users 12, 14, 40 may interact with the GUI 90 access and/or organize information as desired.

The GUI 90 includes various GUI objects. The objects are generally various features provided by the GUI 90. For example, the objects may include indicators (e.g. icons) of folders, files, graphic elements, control elements, and any other features that may be included in the graphical user interface. In the example as shown, the GUI 90 includes a plurality of folders, generally indicated by reference numeral 104, which are further described below.

In some cases, the folders 104 may be generated based upon user input and/or automatically generated based upon other data associated with the user profile. For example, the folders 104 may be automatically generated based upon one or more courses that the user profile is associated with (e.g., a course that the user is enrolled in).

Each of the folders may be assigned a name. In various embodiments, the folder name may be generated based upon user input or preselected automatically without user input. For example, if a folder is generated for one or more of the courses that the user profile is associated with, the folder name may be derived from the name of (or other details about) the course.

In the GUI 90, the folder names include "Economics" for folder 106, "Mathematics" for folder 108, "Philosophy" for folder 110, "Physics" for folder 112 and "Computer Science" for folder 114.

The folders 104 in the GUI 90 are represented using icons that resemble a paper folder. However, in other cases, one or more of the folders 104 may be represented using different icons. That is, the folders 104 (or any other object in the GUI) may be illustrated using labels, text boxes, graphical icons or any other suitable indicia.

Each of the folders 104 has at least one metadata tag associated therewith. The metadata tag, in some cases, could be a keyword, and which may be generally indicative of the subject of the content of the folder.

In some embodiments, one or more of the processors of the system 10 may be configured to provide a keyword generation module, which may assist with generating keywords to associate with one or more object. The keyword generation module is described in further detail with reference to FIG. 6 below.

In the GUI 90, the metadata tag for folder 106 include the keyword "ECON106"; for folder 108, the keyword "MATH108"; for folder 110, the keyword "PHIL110"; for folder 112, the keyword "PHYS112", and for folder 114, the keyword "CISC114".

In some cases, the may be more than one metadata tag associated with each folder. For example, there may be additional metadata tags such as "CS", "ComSci" or any other suitable metadata tags associated with the folder 114.

In some cases, the keywords may be different from the name of the objects. In some cases, one or more of the keywords may be the same as the name of the objects.

Figure 3:
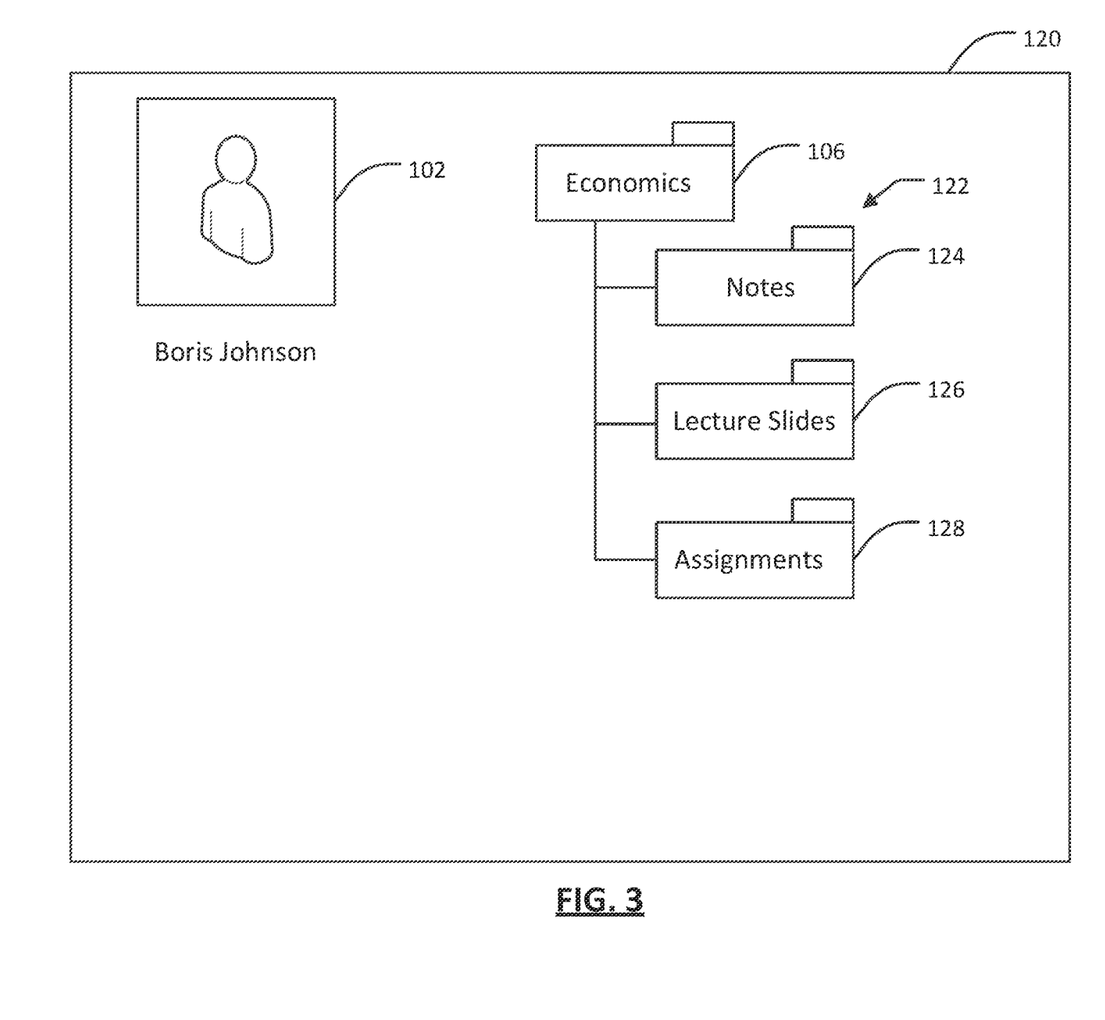
FIG. 3 is a schematic diagram illustrating another exemplary GUI.

Referring now to FIG. 3, illustrated therein is another GUI 120 that may be provided by one or more processors of the system 10. The GUI 120 may be provided when the folder 106 in the GUI 90 is expanded to reveal its contents.

The GUI 120 displays a number of second level folders (i.e. subfolders), generally indicated by reference numeral 122, associated with the folder 106. The folders 122 are hierarchically "nested" within the folder 106 for Economics. In the example as shown, there are three folders 122, namely subfolder 124 entitled "Notes", subfolder 126 entitled "Lecture Slides" and subfolder 128 entitled "Assignments".

Each of the folders 122, will also have at least one metadata tag associated therewith. The metadata tags associated with the folders 122 include the metadata tags associated with the "parent" folder in the hierarchy, which in this case is the folder 106. In the example as shown, each of folders 122 has a metadata tag "ECON106". That is, each of the folder 124, 126 and 128 has the keyword "ECON106" associated with therewith.

Furthermore, each of the folders 122 may also include one or more metadata tags in addition to the metadata tag "inherited" from the parent folder 106. For example, the metadata tag for the folder 124 may be the keyword "Notes", for folder 126, keywords "Lectures" and "Handouts", and for the folder 128, the keywords "Assignments" and "work", all in addition to the metadata tag "ECON106" that was inherited from the parent folder 106.

Figure 4:
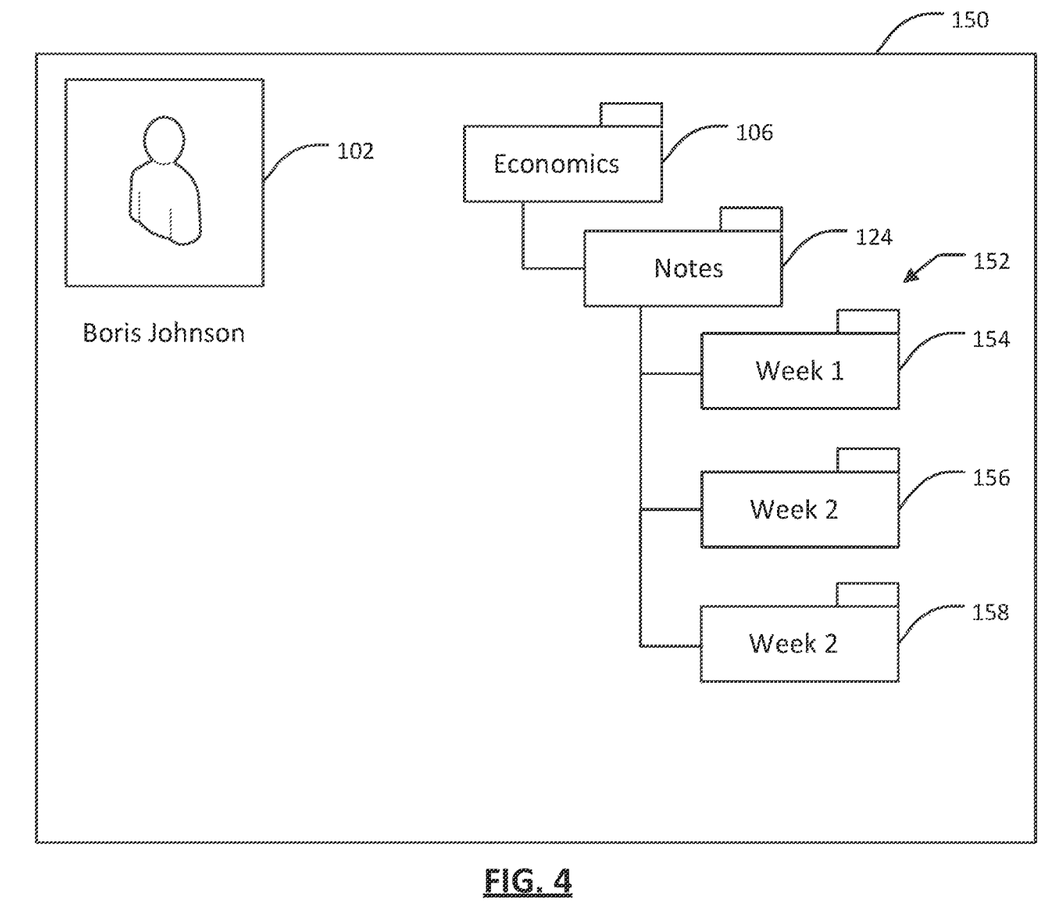
FIG. 4 is a schematic diagram illustrating another exemplary GUI.

Referring now to FIG. 4, illustrated therein is another GUI 150 that may be provided by one or more processors of the system 10. The GUI 150 may be provided when the folder 124 of the GUI 120 is expanded. The GUI 150 illustrates a third level of folders 152 that are nested within the folder 124 in the hierarchy.

The third-level of folders 152 includes three subfolders, namely folder 154 entitled "Week 1", folder 156 entitled "Week 2", and folder 158 entitled "Week 3".

Each of the folders 152 is associated with at least one metadata tag. The metadata tags associated with the folders 152 include the metadata tags associated with the parent folder in the hierarchy, which in this case is the Notes folder 124. In the example as shown, the Notes folder 124 has the keywords "Notes" and "ECON106" associated therewith. Accordingly, the same keywords will also be associated with each of the folders 152. That is, each of the folders 154, 156, and 158 are associated with the metadata tags associated with their parent folder 152, namely the keywords "Notes" and "ECON106".

Furthermore, each of the folders 152 may also have other metadata tags associated therewith, in addition to the metadata tags inherited from the parent folder. In the example as shown, the folder 154 has a metadata tag "W1" associated therewith; the folder 156, a metadata tag "W2"; and the folder 158, a metadata tag "W3".

Figure 5:
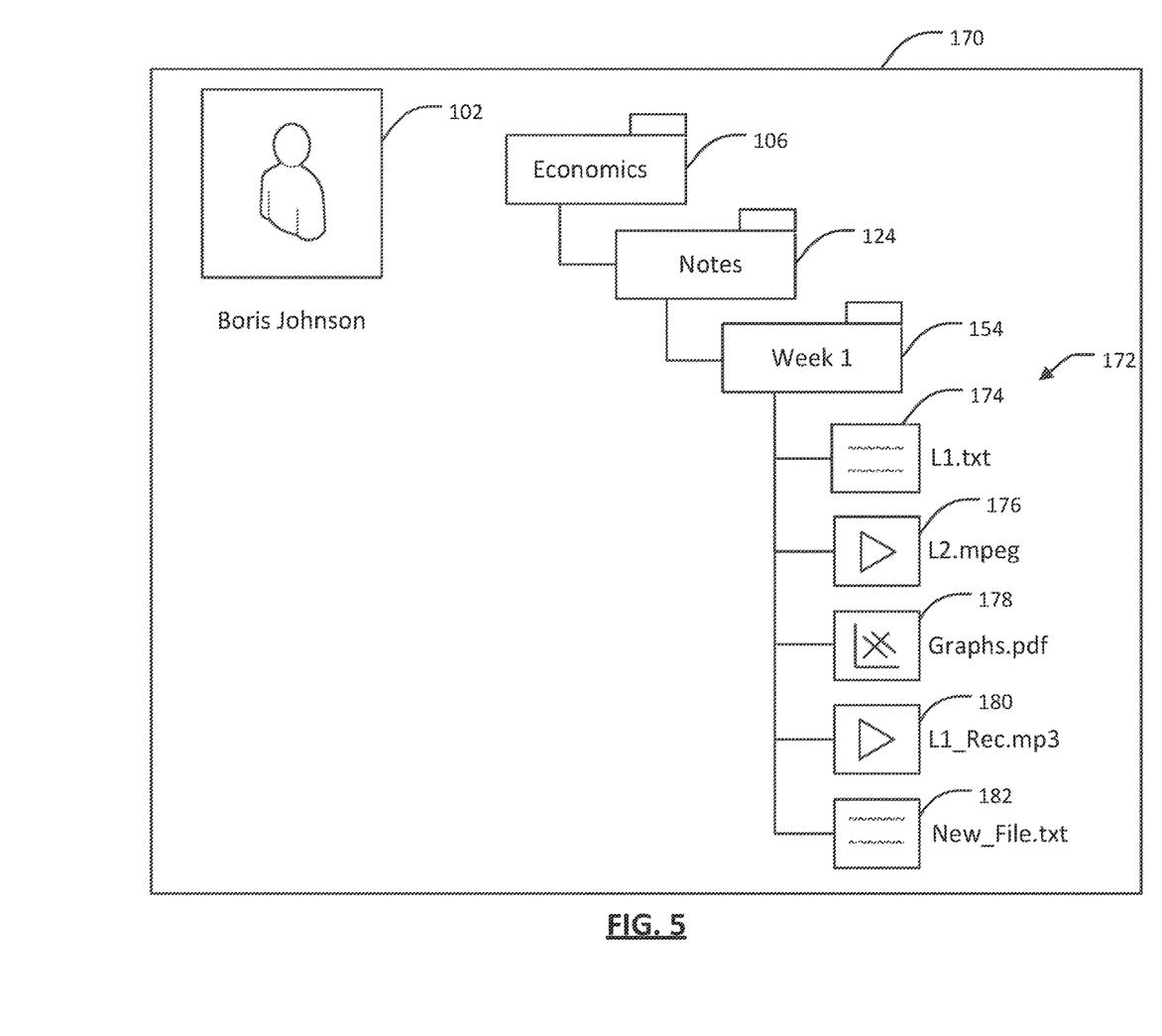
FIG. 5 is a schematic diagram illustrating another exemplary GUI.

Referring now to FIG. 5, illustrated therein is another GUI 170 that may be provided by one or more processors of the system 10. The GUI 170 may be provided when the folder 154 of the GUI 150 is expanded. The GUI 170 includes a plurality of GUI objects 172, which are files of various formats.

In particular, the objects 172 include a first file, namely a text document 174 entitled "L1.txt"; a second file, a video file 176 entitled "L2.mpeg"; a third file, a Portable Document Format (PDF) document 178 entitled "Graphs.pdf"; and fourth file 180, an audio file entitled "Interview.mp3".

The files 172 may be of varying formats, and in the example as shown, the files include a text file, PDF file, video file and audio file. In other cases, there may be files of any other format (e.g., word processing files, image files, etc.) that may be placed in the folder 154.

Each of the files 172 is associated with at least one metadata tag. The metadata tags associated with the folders 172 include the metadata tags associated with the parent folder in the hierarchy, which in this case is the Week 1 folder 154. In the example as shown, the Week 1 folder 154 has the keywords "ECON106", "Notes", and "W1" associated therewith. Accordingly, the same keywords will also be associated with each of the folders 152. That is, each of the files 174, 176, 178, 180, and 182 are associated with the metadata tags associated with their parent folder 174, namely the keywords "ECON106", "Notes", and "W1".

Furthermore, one or more of the files 172 may also have other metadata tags associated therewith, in addition to the metadata tags inherited from the parent folder. In the example as shown, the file 176 is associated with metadata tag keywords "Keynesian" and "Test Material"; and the file 180 is associated with keywords "Test Material".

Associating suitable keywords with various GUI objects maybe advantageous for a number of reasons. The keywords may allow user to effectively search for and locate various objects associated with one or more keywords, regardless of the location of the objects in the hierarchy. The keywords may also be helpful for organizing various learning materials. For example, the learners may indicate the learning materials that the user may be evaluated on by assigning the keywords "test materials" to suitable materials.

The keywords may also be used to generate a customized list of material associated with a particular topic. For example, searching for the keyword "Keynesian" may locate materials that have content relating to Keynesian economics.

While various advantages exist for having suitable keywords associated with various learning materials, it may be time consuming for one or more of the users to assign suitable keywords to the files and folders, and as such users may be dissuaded from doing so. Various embodiments described herein may assist in the association of suitable keywords to various files and folders.

In some embodiments, the keywords may be associated with files and folders automatically without user intervention. For example, in the GUIs described above, the one or more keywords associated with the parent folder in the hierarchy are automatically associated with the objects contained in that folder without user input.

In some embodiments, a list of prospective keywords may be presented to the users such that the users may select one or more of the prospective keywords to associate with the files and folders. These prospective keywords may be determined based upon various factors, as described further in detail below.

The GUIs 90, 120, 150 and 170 illustrate some examples of GUI objects (files and folders) organized in a hierarchical manner. Hierarchical organization of various files and folders may be well understood by one or more the users of the system 10. As such, it may be advantageous to use hierarchical organization to assign various keywords to various files and folders.

For instance, in one example, a new object, namely a file 182 entitled "NewFile.txt" may be added to the folder 154. The new object may be created by a user, "dragged and dropped" from another location, or otherwise added to the folder 154. Generally, in most operating systems when a file is dropped into a folder, a keyword will not be automatically associated therewith.

In contrast, according to some of the teachings herein, when a file is received in a folder, one or more of the processors of the system 10 may be configured to automatically assign one or more keywords to that file that are associated with the folder. For example, one or more of the processors of the system 10 may be configured to associate the file 182 with the metadata tags that are already associated with the folder 154 when the file 182 is placed within the folder 154.

Automatically assigning the metadata tags can allow meaningful metadata tags to be assigned to various objects based upon their location within the hierarchy. This can help save time and more generally provide a more desirable user experience.

Figure 6:
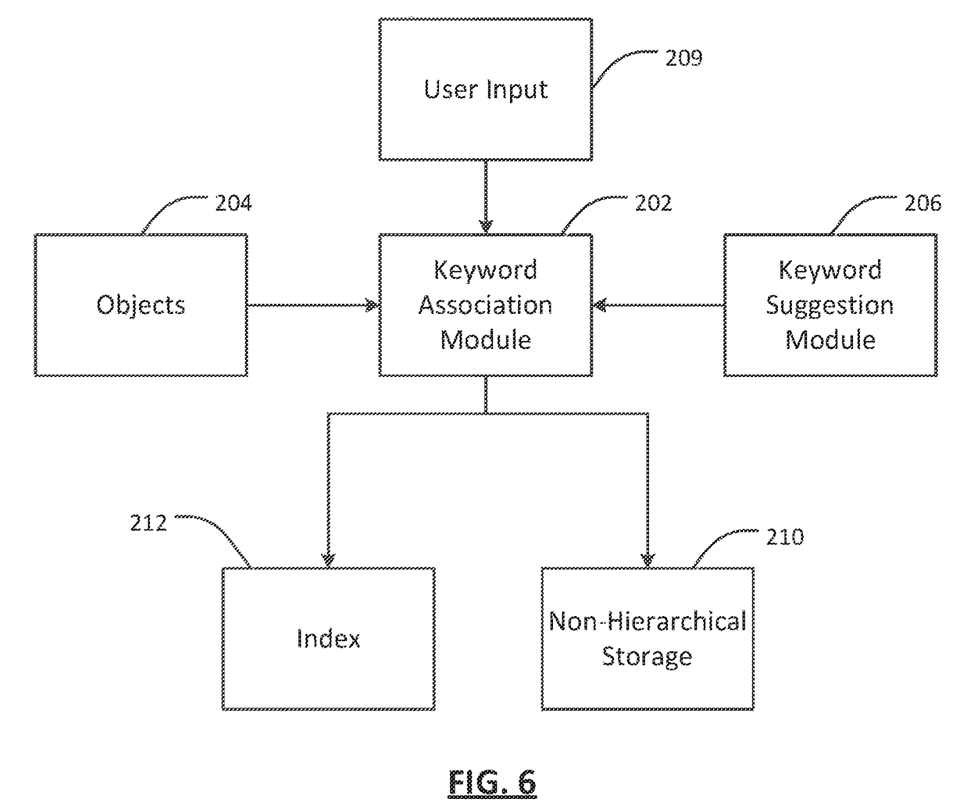
FIG. 6 is a schematic diagram illustrating a number of modules that may be provided by one or more of the processors of the system of FIG. 1 to associate keywords with various objects.

Referring now to FIG. 6, illustrated therein is a schematic diagram illustrating a number of modules 200 that may be provided by various combinations of one or more of the processors of the system 10 to associate suitable metadata tags with various objects. It should be understood that the modules described herein are only for exemplary purposes, and in other embodiments, the design and the number of modules used to implement the functionalities described herein may differ or the functionalities may be implemented in any other suitable manners.

The modules 200 include a keyword association module 202 for generating and associating metadata tags with various GUI objects 204. The objects 204 may include one or more new files or folders or any other suitable GUI object.

In some cases, the one or more of the objects 204 could be manually moved to an existing folder within a hierarchy. For example, the objects 204 may be a new file or a folder that is being created or copied over at a location in a hierarchy of folders in a GUI like described herein.

In some cases, the objects 204 may be provided for batch processing. For example, the objects 204 may be imported from an existing hierarchically organized structure that includes a number of files and folders. As part of that importation, the keyword association module 202 may be used to assign suitable keywords to various existing files and folders.

The keyword association module 202 is in data communication with keyword generation module 206. The keyword generation module 206 can generate various prospective keywords for association with various objects based upon different factors. For example, as described above the keyword generation module may generate prospective keywords that may be associated with an object based upon the particular courses that the user profile is associated with.

In some embodiments, the keyword generation module 206 may generate at least one keyword from the object name (e.g., the folder name for one or more of the folders 104). For example the metadata tag for folder 106 may include the keyword "ECON106"; for folder 108, the keyword "MATH108"; for folder 110, the keyword "PHIL110"; for folder 112, the keyword "PHYS112", and for folder 114, the keyword "CISC114".

In some embodiments, the keyword generation module 206 may generate prospective keywords based upon one or more objects contained within a given folder in a hierarchy. For example, the keyword generation module 206 may generate prospective keywords for association with various objects based upon one or more keywords that are associated with the objects that are located within the folder.

In some embodiments, the keyword generation module 206 may generate prospective keywords for association with various objects based upon content of one or more of the objects contained within the folder, such as, generating prospective keywords from contents of a text document file. For example, the keyword generation module may suggest keywords based upon the title of a document, and/or by frequency of occurrence of certain words in a document.

For instance, in an Economics related document example, the terms "supply" and "demand" may occur most often. In such a case, the keyword generation module 206 may suggest these terms as prospective keywords to be associated with the object containing that document.

In some embodiments, the keyword generation module 206 may generate prospective keywords based upon activities of other user profiles that are similar to a given user profile. For example, the keyword generation module 206 may determine keywords that have been associated with another user profile that is similar to the user profile 92 and use those keywords.

The prospective keywords generated by the keyword generation module 206 for one or more of the objects 204 are provided to the keyword association module 202.

In some embodiments, the keyword association module 202 may receive user input to determine which of the prospective keywords should be associated with one or more of the objects 204. For example, the keyword generation module 206 may suggest a number of prospective keywords to be associated with a given object. The keyword association module 202 may present the prospective keywords to one or more users of the system. The users may then select one or of more of the prospective keywords to be associated with the object.

In some embodiments, the keyword association module 202 may be configured to associate one or more of the prospective keywords with one or more of the objects 204 automatically, without requiring user input.

The keyword association module 202 may generate a metadata index 208 for tracking the association between various keywords and objects in some embodiments.

Figure 7:
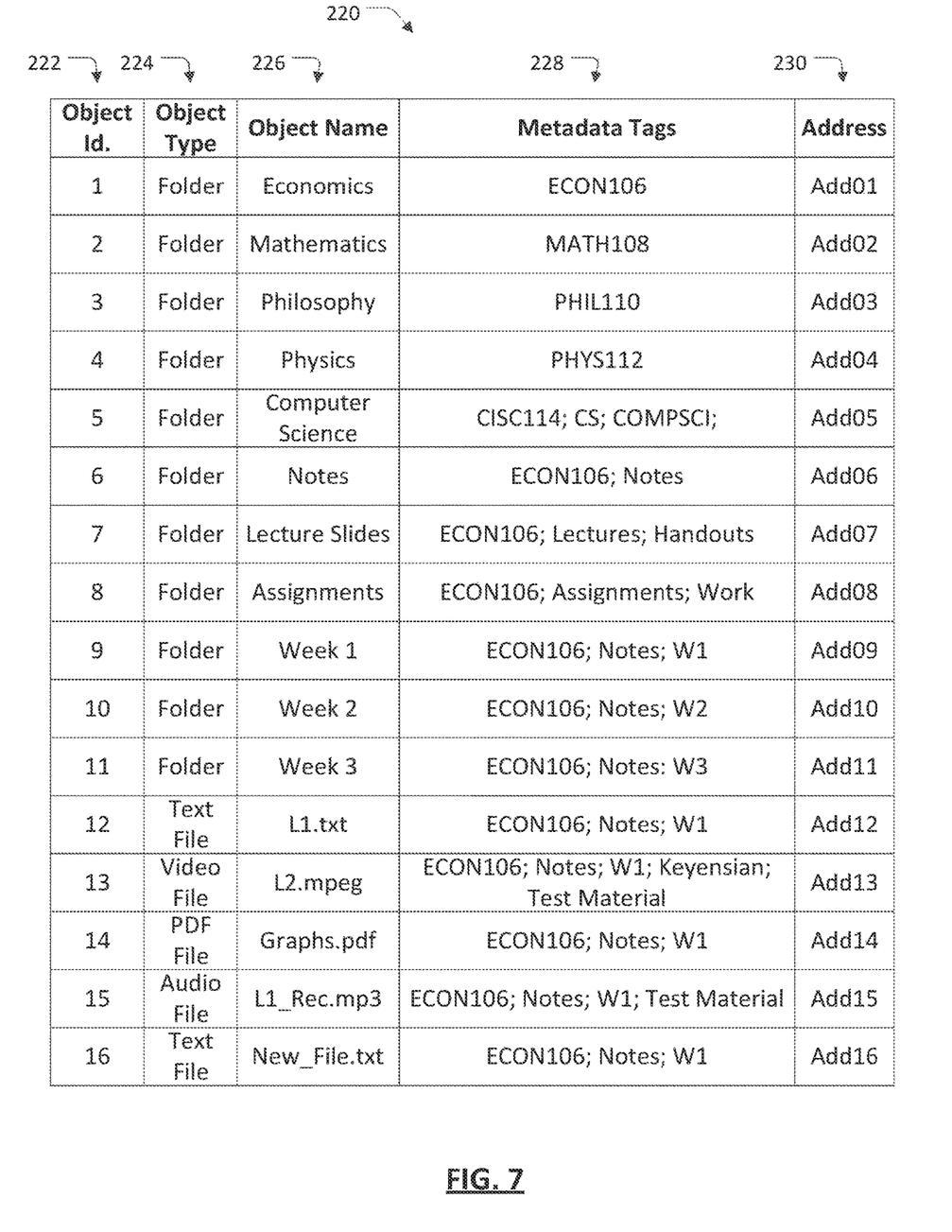
FIG. 7 is a schematic diagram illustrating an exemplary index that may be produced by one or more processors of the system of FIG. 1.

Referring now to FIG. 7, illustrated therein is an exemplary index 220 which may be produced by the keyword association module 202 for the objects of GUI 90, 120, 150, and 170 described herein.

The index 220 includes various metadata information about the object, such as object identifier 222, object type 224, object name 226, associated metadata tags 228, and memory addresses 230. The content of the index 220 in other embodiments may differ.

The object identifier 222 is unique to each of the objects for the purposes of the index 220. That is, each of the objects in the index 220 may be assigned a unique identifier.

The object type 224 may refer to the format or the type of a given object. For example, the object type may be folders, files of various formats, and so on.

The object name 226 may refer to the name of the object (e.g., file or folder) that is assigned to the object. This information may be same as the file-name in some operating systems. The name of the object will normally include at least some alphanumeric characters and symbols. In some cases, the name of the objects may be limited to a certain character set.

The metadata tags 228 may refer to various keywords associated with the object.

The address 230 may refer to the memory address where the object is located. In some cases, the address 230 may refer to a unique identifier or any other information that may facilitate efficient retrieval of information.

In some embodiments, after keywords are assigned to the objects 204, the objects 204 may be stored in a non-hierarchical storage 210. That is, the storage configuration of the objects 204 may not account for hierarchy between various objects.

In some embodiments, one or more of the processors of the system 10 may be configured to regenerate a hierarchy organization of objects based upon the keywords associated with the objects (or having no keywords associated therewith). For example, the objects without any associated keywords may be located at the "root" level, while objects with one keyword may be placed in the first level. The remaining objects may be organized based upon the similarities of keywords that they are associated with.

In some embodiments, the hierarchical organization of various objects that are regenerated from keywords may be the same as the original hierarchy.

In some embodiments, the hierarchical organization of various objects that are regenerated from keywords may be different from the original hierarchy.

In some embodiments, the hierarchical organization of various objects that are regenerated from keywords may be customized based upon user input. For example, the users may wish to organize all files associated with "Week 1" from various subjects first, then subdivide by various learning subjects.

Figure 8:
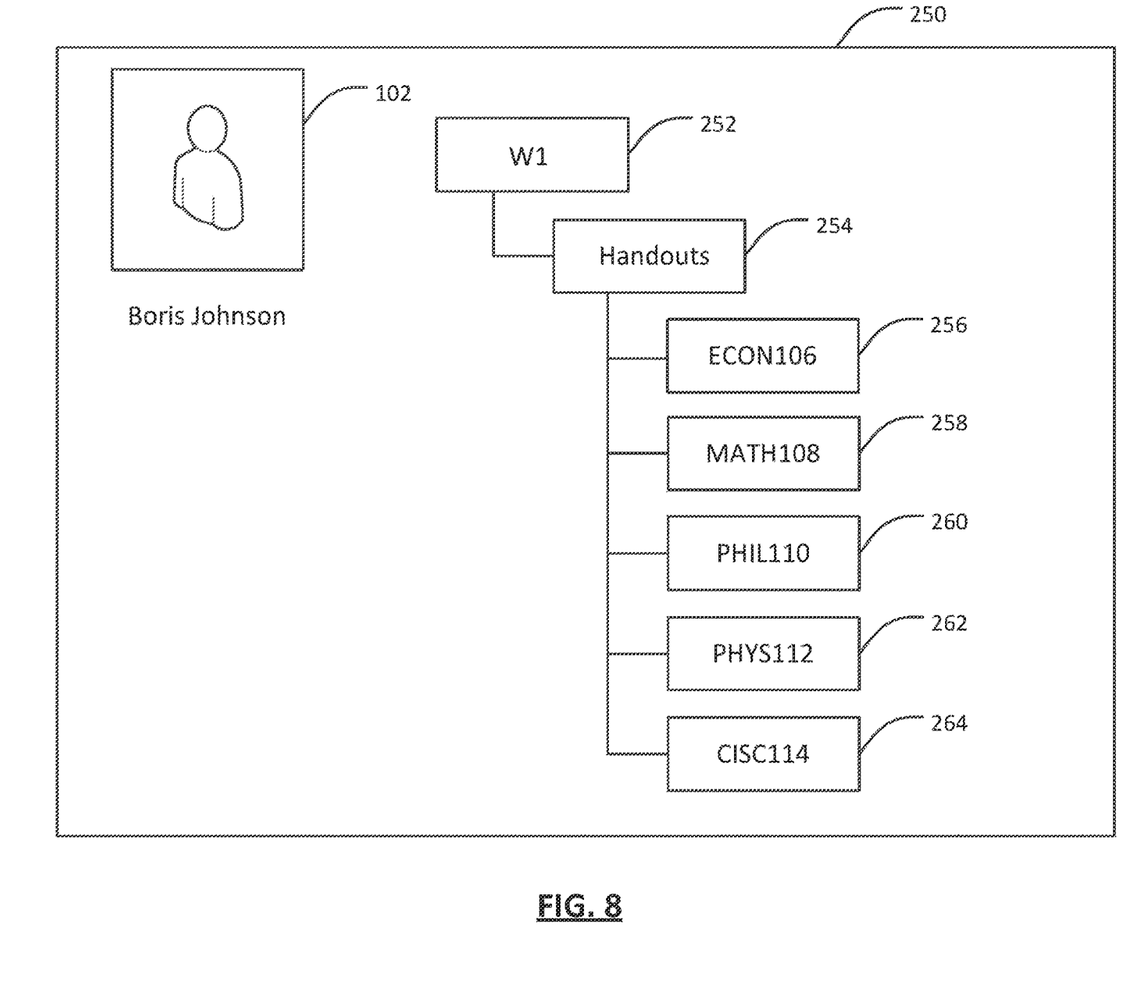
FIG. 8 is a schematic diagram illustrating an exemplary hierarchical organization that may be generated from the information contained in the index shown in FIG. 7.

Referring now to FIG. 8, illustrated therein is another GUI 250 that may be provided by one or more processors of the system 10. The GUI 250 illustrates an exemplary hierarchical organization that may be regenerated from the information contained in the index 208.

In the GUI 250, the objects are organized by the keyword "W1", followed by the keyword "Handouts", followed by their various subjects. This allows the hierarchical structure to be presented in a manner such that the materials are organized by W1 instead of by the subject.

It should be understood that the objects may be organized according to some other criteria such that the hierarchical organizational structure presented is different from the one being described in the GUI 250.

In some cases, a particular set of criteria for organizing the objects may be stored in one of the data storage devices for subsequent retrieval and use. For example, one of the users of the system 10 may prefer to organize their materials to be shown in a particular view using a customized set of criteria. In that case, the user's preference may be saved for later use.

In some cases, a hierarchical organization structure may be generated automatically based upon the keywords associated with the objects.

Figure 9:
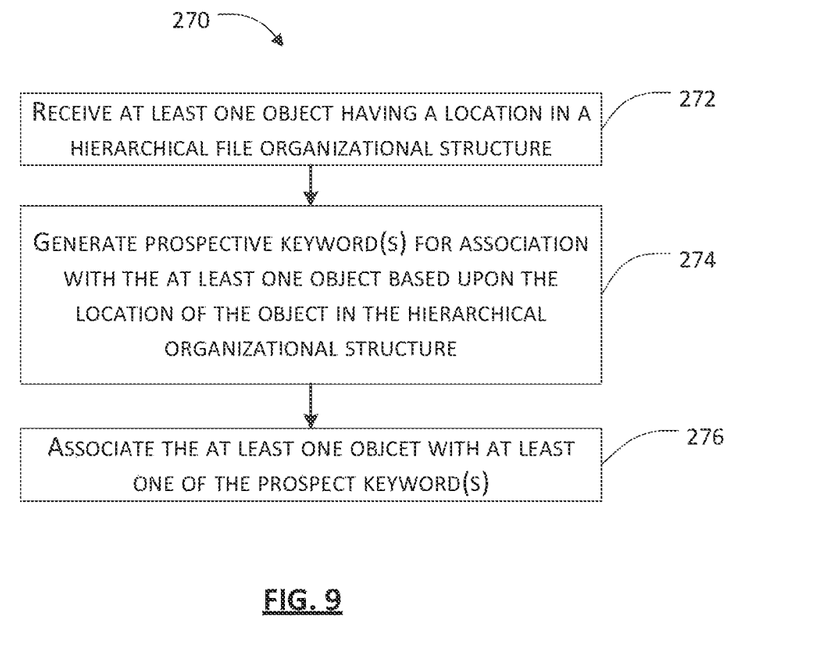
FIG. 9 is schematic diagram illustrating a method for managing information according to some embodiments.

Referring now to FIG. 9, illustrated therein is a method 270 for managing information. The method may be executed, for example, by various combinations of the processors in the system 10 described herein. The method generally starts at step 272.

At step 272, at least one object a location in a hierarchical file organizational structure is received. The hierarchical file organizational structure may be similar to the file organizational structure described in exemplary GUIs described herein above.

At step 274, at least one prospective keyword for the at least one object is generated based upon the location of the object in the hierarchical organization structure. In some embodiments, additional keywords may be generated based upon various factors as described herein above.

At step 276, the at least one object is associated with at least one of the prospective keywords generated in step 274.

It should be understood that even though the embodiments are described herein in relation to electronic learning systems, they may be applicable in other fields of technology, such as health care.

While the above description provides examples of one or more apparatus, methods, or systems, it will be appreciated that other apparatus, methods, or systems may be within the scope of the present description as interpreted by one of skill in the art. Moreover, the scope of the claims appended hereto should not be limited by the embodiments set forth in the examples, but should be given the broadest interpretation consistent with the description as a whole.

The invention claimed is:

1. An information management system comprising:
   (a) at least one electronic data storage device;
   (b) at least one electronic processor coupled to the at least one electronic data storage device, the at least one electronic processor configured to:
      (i) receive at least one electronic object that is stored in a hierarchical format on the at least one electronic storage device wherein the at least one electronic object has a location in a hierarchical file organizational structure, and the at least one electronic object is a folder containing at least one other electronic object;
      (ii) generate at least one prospective keyword for the at least one electronic object based upon at least one of:
         a. at least one keyword associated with the at least one other electronic object contained in the folder, and
         b. content of the at least one other electronic object;
      (iii) associate the at least one electronic object with one or more of the at least one prospective keyword; and
      (iv) store in the at least one electronic data storage device the at least one electronic object in association with the one or more of the at least one prospective keyword
         wherein the at least one electronic object is stored such that the at least one electronic object is locatable by searching using the one or more of the at least one prospective keyword in a graphical user interface that is communicatively coupled to the electronic data storage device, and
         wherein the at least one electronic object is store in a non-hierarchical format wherein the at least one electronic object is stored in the electronic data storage device without storing the location of the at least one received electronic object in the hierarchical organization structure.

2. The system of claim 1, wherein there is at least one other preceding electronic object that precedes the received electronic object in the hierarchical organization structure, and the at least one electronic processor is further configured to associate the at least one received electronic object with at least one keyword associated with the at least one other preceding electronic object that precedes the received electronic object.

3. The system of claim 1, wherein the at least one electronic processor is further configured to generate the at least one prospective keyword based upon one or more object names associated with the at least one received electronic object.

4. The system of claim 1, wherein when the at least one object is associated with a user profile, the at least one electronic processor is further configured to generate the at least one prospective keyword based upon at least one keyword for a same electronic object that is associated with at least one other user profile that is similar to the user profile.

5. The system of claim 1, wherein when there are a plurality of the electronic objects and a plurality of prospective keywords associated therewith, the electronic processor is further configured to generate at least one hierarchical organization structure based upon the keywords associated with the electronic objects.

6. A method for managing information, the method comprising:
   (a) receiving at least one electronic object that is stored in a hierarchical format on at least one electronic storage device wherein the at least one electronic object has a location in a hierarchical file organizational structure, and the at least one electronic object is a folder containing at least one other contained electronic object;
   (b) generating at least one prospective keyword for the at least one electronic object based upon at least one of:
      (ii) at least one keyword associated with the at least one other electronic object contained in the folder, or
      (ii) content of the at least one other object;

(c) associating the at least one electronic object with one or more of the at least one prospective keyword; and (d) storing in the at least one electronic data storage device the at least one electronic object in assocation with the one or more of the at least one prospective keyword, wherein the at least one electronic object is stored such that the at least one electronic object is locatable by searching using the one or more of the at least one prospective keyword in a graphical user interface that is communicatively coupled to the electronic data storage device, and wherein the at least one electronic object is stored in a non-hierarchical format wherein the at least one electrnoic object is stored in the electronic data storage device without storing the location of the at least one received electronic object in the hierarchical organization structure.

7. The method of claim 6, wherein there is at least one other preceding electronic object that precedes the received electronic object in the hierarchical organization structure, and further comprising associating the at least one received electronic object with at least one keyword associated with at least one other preceding electronic object that precedes the received electronic object.

8. The method of claim 6, further comprising generating the at least one prospective keyword based upon one or more object name associated with the at least one electronic object.

9. The method of claim 6, wherein, when the at least one electronic object is associated with a user profile, generating the at least one prospective keyword based upon at least one keyword for a same electronic object that is associated with at least one other user profile similar to the user profile.

10. The method of claim 6, wherein, when there are a plurality of electronic objects and a plurality of the prospective keywords associated therewith, generating at least one hierarchical organization structure based upon the keywords associated with the electronic objects.

* * * * *

UNITED STATES PATENT AND TRADEMARK OFFICE
CERTIFICATE OF CORRECTION

PATENT NO. : 11,836,119 B2
APPLICATION NO. : 17/510723
DATED : December 5, 2023
INVENTOR(S) : Jeremy Jason Auger It is certified that error appears in the above-identified patent and that said Letters Patent is hereby corrected as shown below:

In the Claims

Claim 6, Column 12, Line 67, "content of the at least one other object;" should read -- content of the at least one other electronic object; --

Claim 6, Column 13, Line 15, "electrnoic" should read -- electronic --

Signed and Sealed this
Sixteenth Day of July, 2024

Katherine Kelly Vidal
*Director of the United States Patent and Trademark Office*